United States Patent [19]

Frankila et al.

[11] 4,327,882
[45] May 4, 1982

[54] SEAT BELT RETRACTOR WITH MANUAL LOCK UP

[75] Inventors: John W. Frankila, Sterling Heights; Robert L. Stephenson, Utica, both of Mich.

[73] Assignee: Allied Corporation, Morris Township, Morris County, N.J.

[21] Appl. No.: 161,814

[22] Filed: Jun. 23, 1980

[51] Int. Cl.³ .................... A62B 35/02; B65H 75/48
[52] U.S. Cl. ............................ 242/107.4 A; 280/806
[58] Field of Search ............... 242/107.4 R-107.4 E; 280/801-808; 297/475-480

[56] References Cited

U.S. PATENT DOCUMENTS

| | | | |
|---|---|---|---|
| 3,240,510 | 3/1966 | Spouge | 242/107.4 A X |
| 3,503,571 | 3/1970 | Martin | 242/107.4 A |
| 3,667,698 | 6/1972 | Fisher | 242/107.4 D |
| 3,862,726 | 1/1975 | Ulrich et al. | 242/107.4 D X |
| 3,912,192 | 10/1975 | Shirley | 242/107.4 A |
| 4,135,683 | 1/1979 | Stephenson et al. | 242/107.4 A |
| 4,164,335 | 8/1979 | Kondziola | 242/107.4 A |

*Primary Examiner*—John M. Jillions
*Attorney, Agent, or Firm*—Roger H. Criss

[57] ABSTRACT

A dual spool retractor in which a manual lock up feature is provided in addition to an emergency locking device. A manually engageable member moves a pawl into lock position with the ratchet wheels of the spools. Such member is automatically disengaged upon unwinding of the lap belt retractor whereby the retractor is unlocked.

15 Claims, 5 Drawing Figures

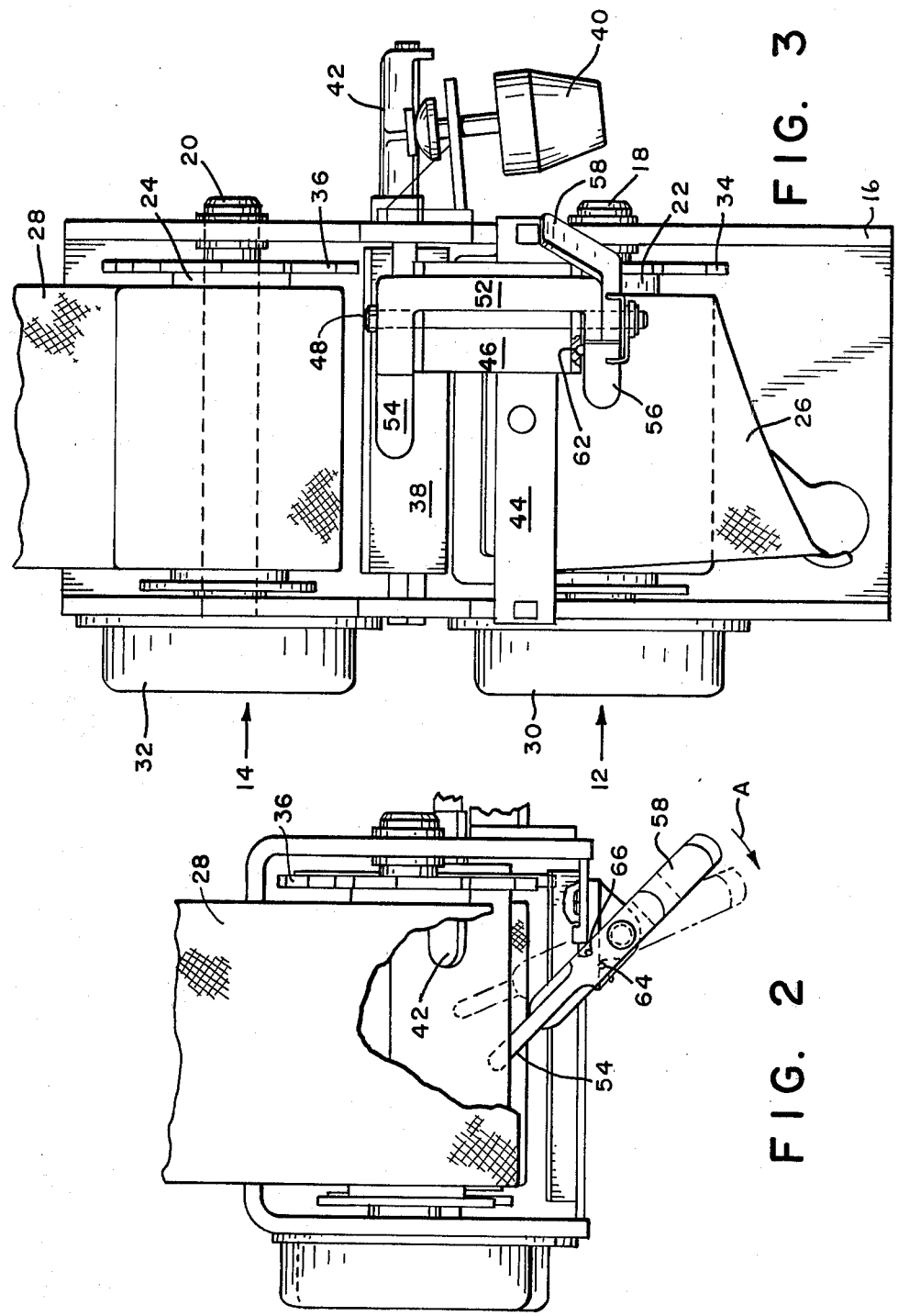

SEAT BELT RETRACTOR WITH MANUAL LOCK UP

BACKGROUND OF THE INVENTION

1. Field of the Invention

This invention relates to an emergency locking seat belt retractor including means to manually lock up the retractor.

2. Description of the Prior Art

Many automobiles are equipped with seat belt retractors that are vehicle sensitive. That is, that they do not lock up until they sense the "G" loading of a collision or other violent maneuver. There exists circumstances in which it would be desirable to mechanically lock up the retractor. Such would be the case, for example, when a child seat was utilized with and is restrained by the seat belt system. An unlocked retractor could allow a child seat to move forward due to the impetus of road vibrations and the like and cause the seat to fall from the vehicle seat or to be in an undesirable position in case of a collision.

It would be desirable if there were available an emergency locking seat belt retractor in which a manual lock up were provided.

SUMMARY OF THE INVENTION

In accordance with this invention, there is provided a seat belt retractor comprising:

storage means adapted to store seat belt webbing, the storage means being movable in opposite belt rewind and extraction direction;

emergency locking means movable from an unlocked to a locked position to automatically lock the storage means against movement in the extraction direction;

manually actuatable means operable to move the locking means to its locked position to manually lock the storage means against movement in the extraction direction; and release means automatically actuatable to release the manually actuatable means upon the establishment of a predetermined wound condition of the seat belt webbing on the storage means.

In a preferred embodiment, the retractor includes rewind means which normally bias the storage means in the rewind direction and the manually actuatable means permits movement of the storage means in the rewind direction.

This invention thus provides an emergency locking retractor, preferably of the vehicle sensitive type, in which a manual lock up is provided and in which the manual lock up is automatically disengaged upon winding up of the seat belt to automatically reset the manual lock up device for the next user. In addition, the lock up mechanism preferably allows the seat belt to be retracted when unbuckling occurs to keep the webbing from being trapped in the door of the vehicle.

This invention is particularly useful with a dual spool retractor in which lap and shoulder belt retractor spools are housed within a single frame and the lap and shoulder belts are connected to a single tongue portion of a buckle assembly.

BRIEF DESCRIPTION OF THE DRAWINGS

FIG. 2 is a top view of the retractor of FIG. 1.

FIG. 3 is a front view of the retractor of FIG. 1.

DESCRIPTION OF THE PREFERRED EMBODIMENTS

Figure 1:
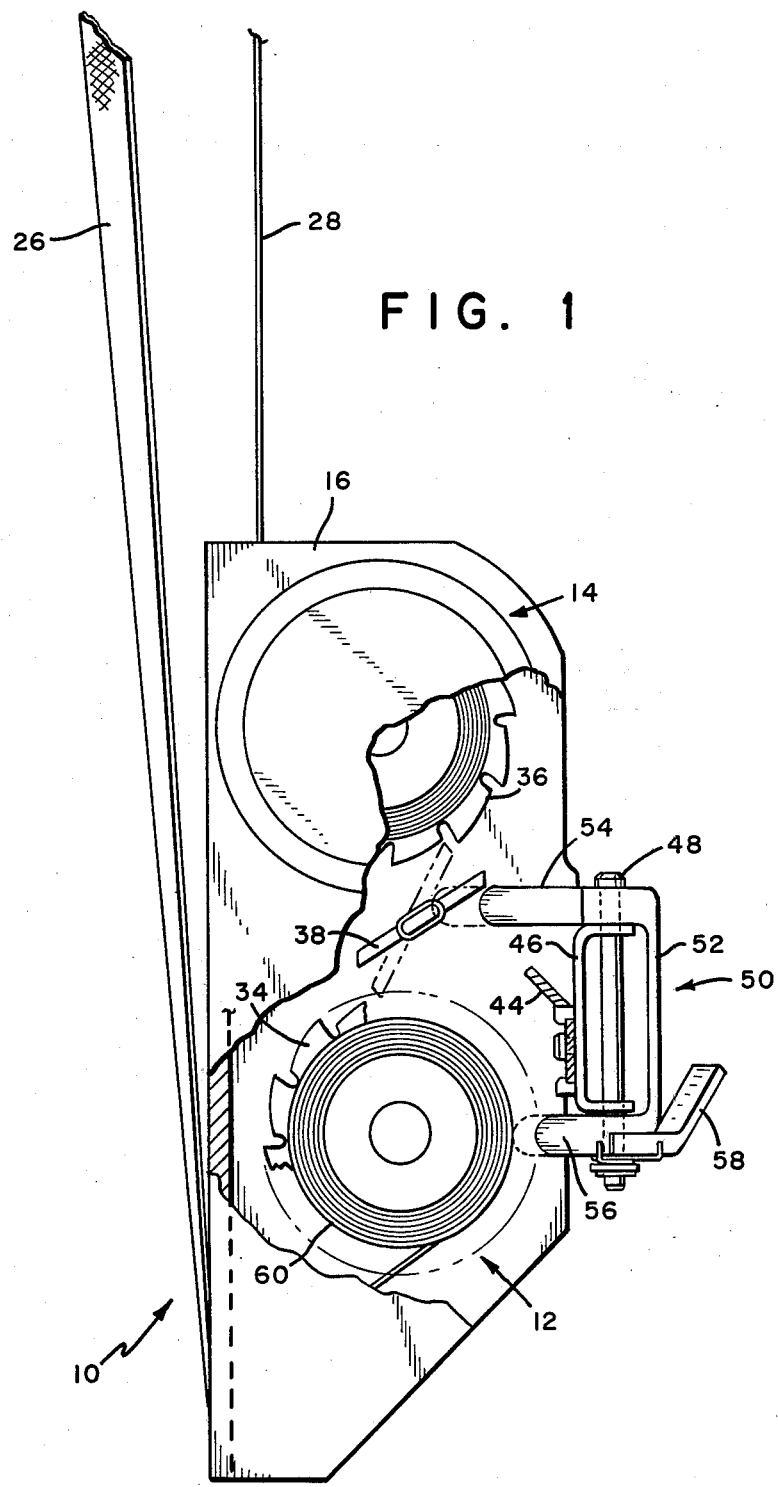
FIG. 1 is a side view with portions broken away of a first embodiment of the retractor of this invention.

With reference to FIGS. 1-3, there is shown a dual spool seat belt retractor generally indicated at 10. Lap belt retractor 12 and shoulder belt retractor 14 are rotatably mounted in retractor 10. Retractor 10 includes a generally U-shaped frame 16 in the legs of which shafts 18 and 20 are rotatably journalled. Fixed on shafts 18 and 20 are spools 22 and 24 upon which are wound lap belt webbing 26 and shoulder belt webbing 28 associated with lap belt retractor 12 and shoulder belt retractor 14, respectively. Rewind springs 30 and 32 are connected to shafts 18 and 20 to urge belts 26 and 28 into the retractors in a rewind direction. Affixed to shafts 18 and 20 are ratchet wheels 34 and 36 which have a plurality of circumferentially spaced peripheral ratchet teeth. Locking pawl 38 is pivotally mounted in frame 16 to lock retractors 12 and 14. Pawl 38 is actuated by movement of vehicle sensitive pendulum 40 suspended from saddle 42 attached to frame 16, as is conventional, to move into contact with the ratchet teeth of both retractors upon a rapid deceleration of the vehicle in which retractor 10 is mounted to lock retractors 12 and 14. A dual spool retractor of this type is described in U.S. Pat. No. 4,135,683 to Stephenson et al., the disclosure of which is expressly incorporated herein by reference.

Retractor frame cross brace 44 extends between the legs of frame 16 and has affixed to it a support member 46. A shaft 48 is rotatably mounted in support member 46. Lever 50 is pivotally mounted on shaft 48 and includes a central portion 52 from which arms 54, 56 and 58 extend. Rotation of arm 58 in the direction of arrow A (FIG. 2) from the solid line to the dotted line position causes arm 54 to contact pawl 38. Continued movement of arm 54 will move pawl 38 into engagement with ratchet wheels 34 and 36, thereby locking the retractors. It will be noted that locking pawl 38 only prevents extraction rotation of spools 22 and 24. No such restriction is applied to the rewinding rotation of spools 22 and 24 to rewind the webbing. When lever 50 is pivoted, arm 56 is moved from its solid to dotted line positions in FIG. 1 to be positioned adjacent to roll 60 of lap belt webbing 26 wound up on spool 22.

When not in use, lap belt webbing 26 is rewound on spool 22. As lap webbing is rewound webbing roll 60 grows in diameter thereby exerting a force on arm 56 of lever 50, which in turn pivots lever 50 back to the unlocked position at which arm 54 is no longer engaged with pawl 38.

Arm 56 is provided with a protrusion 62 (FIG. 3) which cooperates with depressions 64 and 66 in support member 46 (FIG. 2) to bias lever 50 into and be retained in the unlocked and locked positions, respectively.

Lever 50 is formed of a plastic material which permits some flexure of arm 54. In the event that ratchet wheels 34 and 36 are not in a position to accept pawl 38 when lever 50 is manually rotated to the locked position, the flexure of arm 54 permits a continued force to be exerted onto pawl 38 until ratchet wheels 34 and 36 move due to the bias of rewind springs 30 and 32 into position to accept pawl 38 and thereby lock the retractors.

In operation, lap belt 26 and shoulder belt 28 are extended by the user until the belts are buckled, such as about a child seat. Lap belt webbing 26 and shoulder belt webbing 28 are extended from spools 22 and 24 by rotation of such spools in the extraction direction against the bias of their respective rewind springs. When it is desired to manually lock up the retractor, such as after placing a child seat on a vehicle seat and extending the seat belt webbing thereabout, the user manually pivots arm 58 of lever 50, thereby bringing arm 54 of lever 50 into engagement with pawl 38 to thereby move pawl 38 into its lock position at which further extention from retractors 12 and 14 is prevented. At the same time, arm 56 of lever 50 is moved adjacent to roll 60 of lap belt webbing 26. When the combined lap and shoulder belts are unbuckled, the belts are rewound onto their respective spools due to the biasing force of their respective rewind springs until the diameter of roll 60 of lap belt webbing 26 has reached a position at which it contacts lever arm 56 and thereby pivots lever 50 back to its original position. Such pivoting motion moves lever arm 54 away from pawl 38 and thereby releases pawl 38 to rotate back from its dotted line position in FIG. 1 to its solid line position due to gravity. Thus, spools 22 and 24 are unlocked. This preferably is designed to occur when lap belt webbing has almost completely been rewound onto spool 22. As a result of the automatic disengagement of lock up mechanism, the manual lock up device is ready for the next use.

Figure 4:
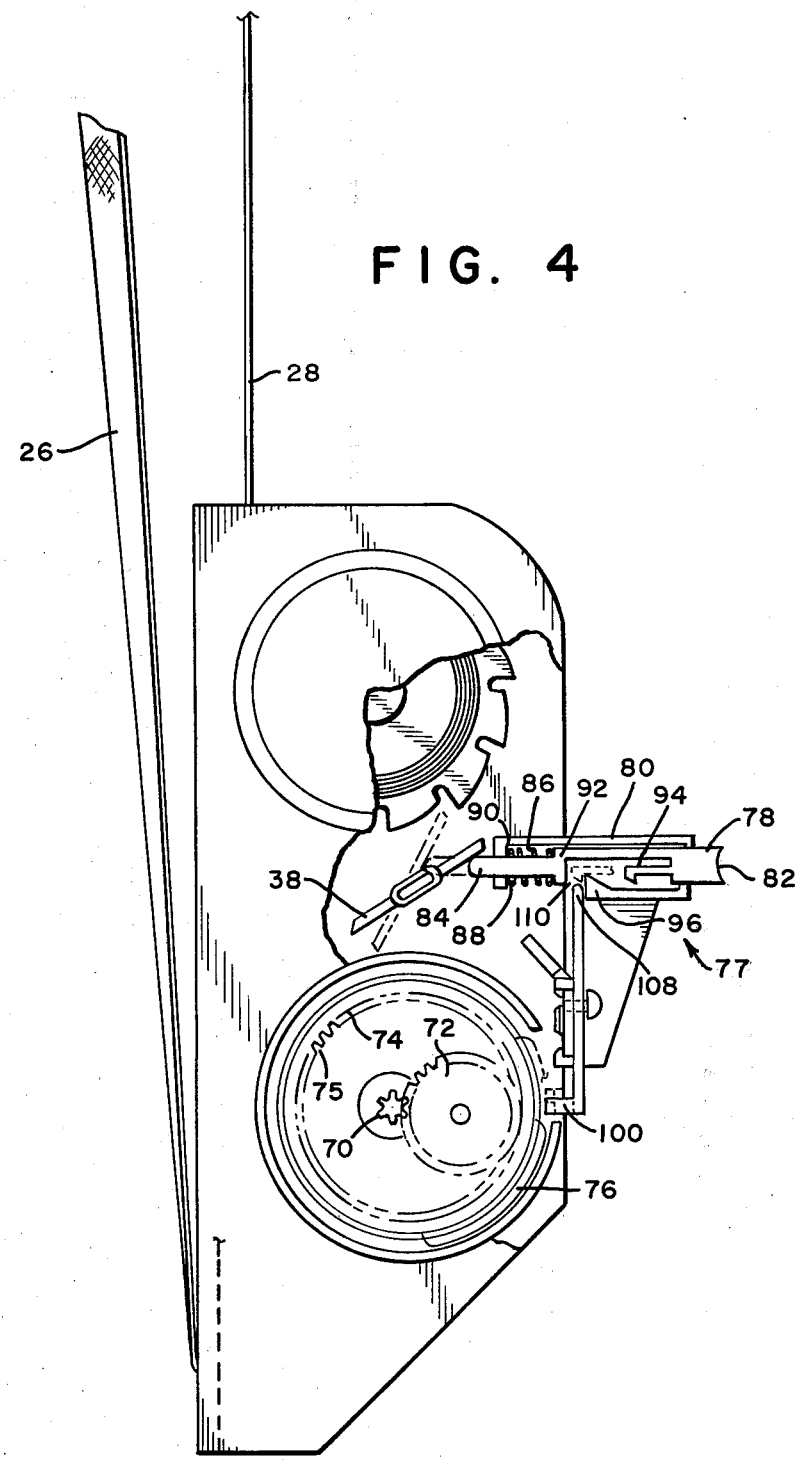
FIG. 4 is a side view of a second embodiment of the retractor of this invention with portions broken away.
Figure 5:
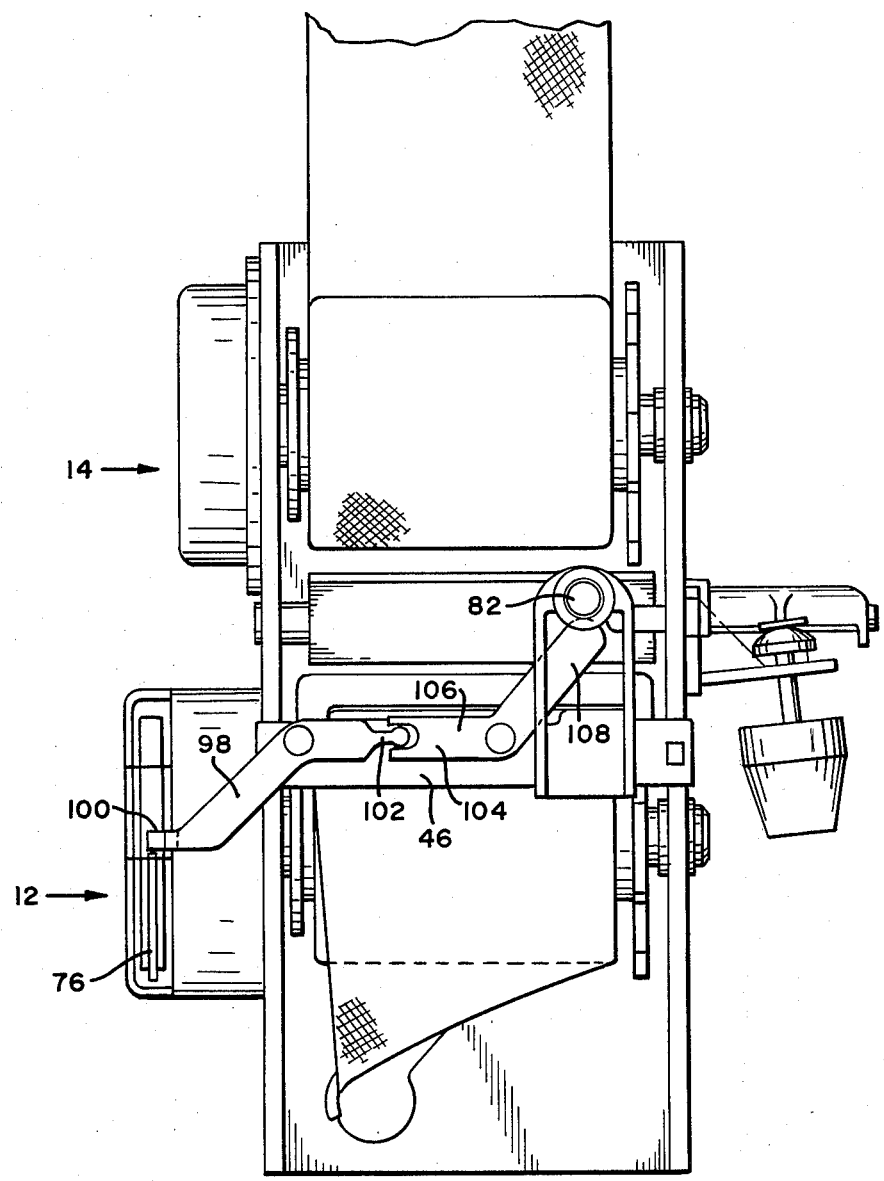
FIG. 5 is a front view of the retractor of FIG. 4.

In accordance with a second embodiment of this invention shown in FIGS. 4 and 5, the release means is responsive to a predetermined rotation of lap belt retractor 12 as opposed to the sensing of a predetermined amount of webbing on lap belt retractor 12. Affixed to one end of shaft 18 of lap belt retractor 12 is a spur gear 70. A planetary gear 72 is in meshing relationship with spur gear 70 and is surrounded by ring gear 74 provided with internal teeth 75 which also mesh with the teeth of planetary gear 72. Provided on a circumferential portion of ring gear 74 is a cam 76. Gear ratios are chosen so that for each revolution of spur gear 70, ring gear 74 rotates only a portion of a revolution. A gear train of this type is shown, for example, in U.S. Pat. No. 3,880,379 to Booth.

Mounted on support member 46 is a slidable actuating member generally indicated at 77. Member 77 includes a push button 78 slidably mounted in housing 80. One end 82 of push button 78 is provided with a concave surface for manual contact by the user. The other end 84 of push button 78 extends through housing 80 and includes a contact surface for engagement with and movement of locking pawl 38. Coil spring 86 is fitted over stem portion 88 of push button 78 adjacent end 84 and is retained between an interior surface 90 of housing 80 and rim 92 of stem 88. Spring 86 biases push button 78 to the unlocked position (to the right when viewed in FIG. 4). A hook arm 94 extends from end 82 of push button 78. An inclined stop surface 96 is provided in housing 80 and is adapted to be engaged by and retained by hook arm 94. Lever 98 is pivotably mounted on support member 46 and includes one end 100 which is positioned for engagement by cam 76 of ring gear 74. The other end 102 of lever 98 is in contact relationship with one end 104 of a second lever 106 also pivotably mounted on support member 46. The opposite end 108 of lever 106 is movable into contact with hook arm 94 through an opening 110 in housing 80.

In operation, assume lap and shoulder belt webbing 26 and 28 have been extended from retractors 12 and 14 and the belts have been extended across and restrain a child seat. Pawl 38 is in its unlocked position. To manually lock pawl 38, the user depresses push button 78 forcing end 84 into engagement with pawl 38 and moving pawl 38 from its unlocked solid line position in FIG. 4 to its locked position shown in dotted lines, at which it is engageable with the ratchet teeth of ratchet wheels 34 and 36 to prevent rotation of the retractors in the extraction direction. Such movement of push button 78 moves hook arm 94 up inclined stop surface 96 and into interlocking engagement therewith, thereby retaining push button 74 in its locking position and compressing spring 86.

As pointed out above, pawl 38 is effective only to prevent extraction rotation of spools 22 and 24. When the lap and shoulder belts are released by unbuckling the seat belt, rewind springs 30 and 32 rotates spools 22 and 24 in the rewind direction, with pawl 38 ratcheting over the ratchet teeth. As shaft 18 of lap belt retractor is rotated spur gear 70 is rotated and ring gear 74 is rotated in the opposite direction through the gear train established by planetary gear 72. When the lap belt webbing is almost completely wound up on spool 22, ring gear 74 has rotated so that its cam 76 moves into contact with end 100 of lever 98 and thereby pivots lever 98. This motion is transmitted to lever 106 resulting in upward movement of end 108 (FIG. 4) into contact with hook arm 94. Hook arm 94 is thereby moved out of engagement with stop surface 96 and push button 78 is returned to its original position due to the bias of spring 86. Pawl 38 then pivots to its unlock position due to gravity.

Although in the foregoing reference has been made to a dual spool retractor, it is to be understood that the present invention may be utilized with a single spool retractor. In addition, it is to be understood that the retractor may include any type of emergency locking sensor, whether it be vehicle or web sensitive.

It can be seen that the present invention provides a relatively simple way of manually locking up a seat belt retractor to secure a child seat in a vehicle seat, for example. The lock up device does not prohibit retraction of the seat belt webbing and is automatically disengaged when the seat belt webbing is rewound to its fully retracted or almost fully retracted position. As a result, the lock up mechanism is available for the next use. It is also apparent that the present invention provides a manual lock up feature which does not interfere with the emergency locking feature of the retractor when the manual feature is not employed.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:
1. A seat belt retractor comprising:
 storage means adapted to store seat belt webbing, said storage means being movable in opposite belt rewind and extraction directions;
 emergency locking means movable from an unlock to a lock position to automatically lock said storage means against movement in the extraction direction;

manually actuatable means operable to move said locking means to its locked position to manually lock said storage means against movement in the extraction direction; and release means automatically actuatable to release said manually actuatable means upon the establishment of a predetermined wound condition of said seat belt on said storage means.

2. The seat belt retractor of claim 1 including rewind means normally biasing said storage means in the rewind direction, said manually actuatable means permitting movement of said storage means in the rewind direction.

3. The seat belt retractor of claim 2 wherein said release means is automatically actuatable upon the sensing of a predetermined amount of seat belt webbing on said storage means.

4. The seat belt retractor of claim 2 wherein said release means is automatically actuatable upon a predetermined amount of rewind movement of such storage means.

5. The seat belt retractor of claim 2 including a housing and wherein said storage means comprises at least one spool rotatably mounted in said housing for rotation in the rewind and extraction directions.

6. The seat belt retractor of claim 5 wherein said emergency locking means comprises a locking pawl and an inertia sensor operable to move said pawl to a locked position upon a predetermined amount of acceleration or deceleration, and including ratchet means in connection with said spool, said locking pawl being engageable in its lock position with said ratchet means to prevent rotation of said spool in the extraction direction.

7. The seat belt retractor of claim 6 wherein said inertia sensor comprises a pendulum member and said ratchet means comprises at least one ratchet wheel fixed for rotation with said spool and including peripheral ratchet teeth engageable by said pawl.

8. The seat belt retractor of claim 5 including first and second spools respectively storing lap belt and shoulder belt webbing.

9. The seat belt retractor of claim 8 wherein said emergency locking means comprises a locking pawl operable to lock both said first and second spools against rotation in said extraction direction.

10. The seat belt retractor of claim 9 wherein said release means is actuatable upon the establishment of a predetermined wound condition of said lap belt webbing on said first spool.

11. The seat belt retractor of claim 10 wherein said manually actuatable means comprises a pivotable lever having a first portion engageable with said locking pawl to move said locking pawl to its lock position when said lever is pivoted to a first position and a second portion engageable with said lap belt webbing stored on said first spool to pivot said lever to a second position at which said locking pawl is not retained in its lock position when a predetermined amount of lap belt webbing is wound on said first spool.

12. The seat belt retractor of claim 11 including means to retain said pivotable lever in its first position and wherein said first portion of said pivotable lever is flexible so as to bias said locking pawl into its lock position.

13. The seat belt retractor of claim 10 wherein said manually actuatable means comprises a member slidable between a first position at which said locking pawl is in its lock position and a second position at which said locking pawl is not retained in its lock position.

14. The seat belt retractor of claim 13 including a gear mechanism responsive to rotation of said first spool, and movable intermediary means positioned between said gear mechanism and said slidable member to release said slidable member from its first position, thereby releasing said locking pawl.

15. The seat belt retractor of claim 14 including means biasing said slidable member towards its second position and means to retain said slidable member in its first position against the bias of said biasing means.

* * * * *